(12) United States Patent
Guo et al.

(10) Patent No.: US 12,454,928 B2
(45) Date of Patent: Oct. 28, 2025

(54) MULTISTAGE VARIABLE BURNING RATE SOLID ROCKET MOTOR AND FORMING METHOD

(71) Applicant: DALIAN UNIVERSITY OF TECHNOLOGY, Liaoning (CN)

(72) Inventors: Fengnan Guo, Liaoning (CN); Yanxiang Ren, Liaoning (CN); Fengrui Li, Liaoning (CN); Hua Zhang, Liaoning (CN); Yiming Li, Liaoning (CN); Wenyu Li, Liaoning (CN); Hongfeng Ji, Liaoning (CN); Lin Fu, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 0 days.

(21) Appl. No.: 18/962,602

(22) Filed: Nov. 27, 2024

(65) Prior Publication Data
US 2025/0084806 A1  Mar. 13, 2025

(30) Foreign Application Priority Data
Jan. 5, 2024 (CN) .......................... 202410018453.0

(51) Int. Cl.
 *F02K 9/36* (2006.01)
 *F02K 9/12* (2006.01)
 *B33Y 80/00* (2015.01)
(52) U.S. Cl.
 CPC .................. *F02K 9/12* (2013.01); *F02K 9/36* (2013.01); *B33Y 80/00* (2014.12)

(58) Field of Classification Search
 CPC ..... F02K 9/12; F02K 9/24; F02K 9/36; F02K 9/60; B33Y 80/00
 See application file for complete search history.

(56) References Cited

U.S. PATENT DOCUMENTS

| | | | | |
|---|---|---|---|---|
| 3,069,844 A | * | 12/1962 | Bearer | F02K 9/95 60/39.47 |
| 4,357,795 A | * | 11/1982 | Bastian | F02K 9/94 60/245 |
| 4,590,860 A | * | 5/1986 | Kromrey | F02K 9/24 102/292 |

* cited by examiner

*Primary Examiner* — Steven M Sutherland
(74) *Attorney, Agent, or Firm* — MUNCY, GEISSLER, OLDS & LOWE, P.C.

(57) ABSTRACT

The present invention discloses a multistage variable burning rate solid rocket motor and a forming method. A multi-material composite fiber skeleton structure is embedded inside a propellant in the present invention, so that the original burning rate of the propellant presents multistage changes to achieve the function of multistage thrust. The fiber skeleton structure embedded in the solid rocket motor is formed by additive manufacturing, fixed in a combustion chamber, and then charged at one time to complete the forming of a motor grain. The design can greatly increase the burning rates of the propellants of end-burning and bore-burning motors, and can also conduct multistage adjustment for the burning rates of the motors by changing the fiber skeleton and structure, so as to satisfy the requirements of missile weapon systems for multistage power propulsion. The present invention greatly simplifies the technological production process of the existing single-chamber multi-thrust motor.

8 Claims, 3 Drawing Sheets

MULTISTAGE VARIABLE BURNING RATE SOLID ROCKET MOTOR AND FORMING METHOD

TECHNICAL FIELD

The present invention belongs to the technical field of aerospace, relates to the design of a solid rocket motor (SRM), and particularly relates to a multistage variable burning rate solid rocket motor and a forming method.

BACKGROUND

As a power unit frequently used in missiles, a solid rocket motor plays an important role in the design of weapon systems. To better facilitate energy distribution and improve the missile range, some missile weapons use the initial high-thrust boost phase and the low-thrust cruise phase in combinations in the design process. For some special combat scenarios, the weapon system needs more complex multi ballistics combinations to achieve the corresponding functions, which requires the power system to have multi internal ballistics characteristics to provide multistage variable thrust for the weapon system. Most current variable thrust missile weapons use single-chamber dual-thrust (single-chamber multi-thrust) motors to achieve the variable thrust and variable stage functions. The single-chamber dual-thrust motor is a motor that generates two-stage thrust in a combustion chamber. This motor can provide short time high thrust for the takeoff of the rocket to provide long time endurance thrust for the flight process. However, the existing single-chamber dual-thrust motor is generally required to be designed with an extremely complex grain structure to achieve multistage change in a burning surface, or to use propellants with different burning rates for segmented charge. These measures increase the technological manufacturing difficulty and maintenance cost of the variable thrust motor.

SUMMARY

To solve the above problem, the present invention provides a multistage variable burning rate solid rocket motor and a forming method. A multi-material composite fiber skeleton structure is embedded inside the propellant in the present invention, so that the original burning rate of the propellant presents multistage changes to achieve the function of multistage thrust. The fiber skeleton structure embedded in the solid rocket motor is formed by additive manufacturing, fixed directly or indirectly in the combustion chamber, and then charged at one time to complete the forming of a motor grain. The design can greatly increase the burning rates of the propellants of end-burning and bore-burning motors, and can also conduct multistage adjustment for the burning rates of the motors by changing the fiber skeleton and structure, so as to satisfy the requirements of the missile weapon systems for multistage power propulsion.

The technical solution of the present invention is as follows:

A multistage variable burning rate solid rocket motor comprises a combustion chamber case 1, an insulator 2, a propellant grain 3, a fiber skeleton structure 4, a fixed fiber 7 and a tooling 8.

The insulator 2 is bonded on an inner surface of the combustion chamber case 1.

The tooling 8 is bolted with an end of the combustion chamber case 1 when charging, and is disassembled after charging.

The fiber skeleton structure 4 is arranged in the combustion chamber case 1 and composed of a plurality of axial fibers 5 perpendicular to an end surface of a main grain and radial fibers 6 parallel to the end surface of the main grain, wherein front ends of the axial fibers 5 are connected with the insulator 2 by threads, and ends are connected with the fixed fiber 7; the fixed fiber 7 is simultaneously connected with the tooling 8 by threads; and the radial fibers 6 are evenly distributed along the axial fibers 5 at equal intervals, or the distribution mode can be changed according to the adjustment needs of the burning rate.

After the fiber skeleton structure 4 is connected with the combustion chamber case 1, the propellant grain 3 is filled in the combustion chamber case 1 by a charge hole reserved by the tooling 8.

Further, the fiber skeleton structure 4 is formed by an additive manufacturing method.

Further, the fiber skeleton structure 4 is divided into a plurality of sections with the same structure and different lengths along an axial direction according to the needs of multistage burning rate change; each section is composed of different materials respectively; and each section is integrally printed and formed by additive manufacturing mode to form an overall fiber skeleton structure 4.

Further, the fiber skeleton structure 4 is formed by connecting and combining multiple metal materials with thermal conductivity greater than 100 W/(m·K), and simultaneously satisfies the needs of additive manufacturing and skeleton strength; and the metal materials include copper, silver, aluminum, etc.

Further, when the fiber skeleton structure 4 is combined by multiple metal materials, alloy materials with close melting points with two adjacent connected metals are used on the connection regions of different metal materials for transition to ensure good connection and uniform transition between two materials.

Further, the fiber skeleton structure 4 is formed by connecting and combining metal materials and non-metal materials with thermal conductivity greater than 100 W/(m·K), and simultaneously satisfies the needs of additive manufacturing and skeleton strength; and the non-metal materials include graphite, silicon carbide, etc.

Further, when the fiber skeleton structure 4 is combined by multiple metal materials and non-metal materials, carbon fiber materials are used on the transition regions of different materials for transition to ensure good connection and uniform transition between two materials.

Further, threaded holes are embedded in the insulator 2 and the tooling 8 for fixing the fiber skeleton structure 4.

Further, the radial fibers 6 of adjacent layers in the fiber skeleton structure 4 are supported and fixed by a plurality of crossed fibers to make the fiber skeleton structure 4 more stable and reliable.

A forming method of the multistage variable burning rate solid rocket motor comprises the following steps:

step 1: according to the needs of multi ballistics of a weapon system, conducting the overall design of the motor and determining the multistage change range of the burning rate; determining the basic burning rate data and a required speed increasing ratio of the propellant grain 3 according to the change range of the burning rate, reversely calculating the thermal conductivity data of the material according to the speed increasing ratio, selecting the material of the fiber skeleton structure 4 according to the thermal conductivity range, then selecting the combined structure form of the fiber skeleton structure 4 according to the multistage change rule of the burning rate and finally printing the multistage material fiber skeleton structure 4 by additive manufacturing;

step 2: putting the fiber skeleton structure 4 from additive manufacturing into the combustion chamber case 1; after connecting the front ends of the axial fibers 5 with the insulator 2 through the threads and connecting the ends with the fixed fiber 7, making the fixed fiber 7 penetrate through the tooling 8 and tensioning; then fixing the fixed fiber 7 with the tooling 8 through the threads; and connecting the tooling 8 with the combustion chamber case 1;

step 3: after vacuuming the combustion chamber case 1, casting the propellant grain 3 through the charge hole in the tooling 8 by case bonded casting;

step 4: after the propellant grain 3 is completely solidified, removing the threads which connect the fixed fiber 7 in the tooling 8, then removing the tooling 8 and the combustion chamber case 1, and finally cutting a part connected with the fixed fiber 7 in the axial fibers 5 to complete the forming of the multistage variable burning rate solid rocket motor.

The present invention has the following beneficial effects: The method of the present invention can realize the design and the forming of the multistage variable burning rate solid rocket motor, and satisfy the needs of the missile weapon system for multistage variable thrust power. In the method, the multi-material fiber skeleton is installed so that the multistage burning rate regulation can be realized on the premise of one-time charge, thereby greatly simplifying the technological production process of the existing single-chamber multi-thrust motor. Meanwhile, the method increases the burning rate of the propellant by a physical means. Compared with a chemical catalytic method, the method can significantly reduce the safety indexes of the propellant such as friction sensitivity and impact sensitivity. Therefore, the multistage change function of the propellant with high burning rate can be realized safely and effectively by the forming method.

Figure 1:
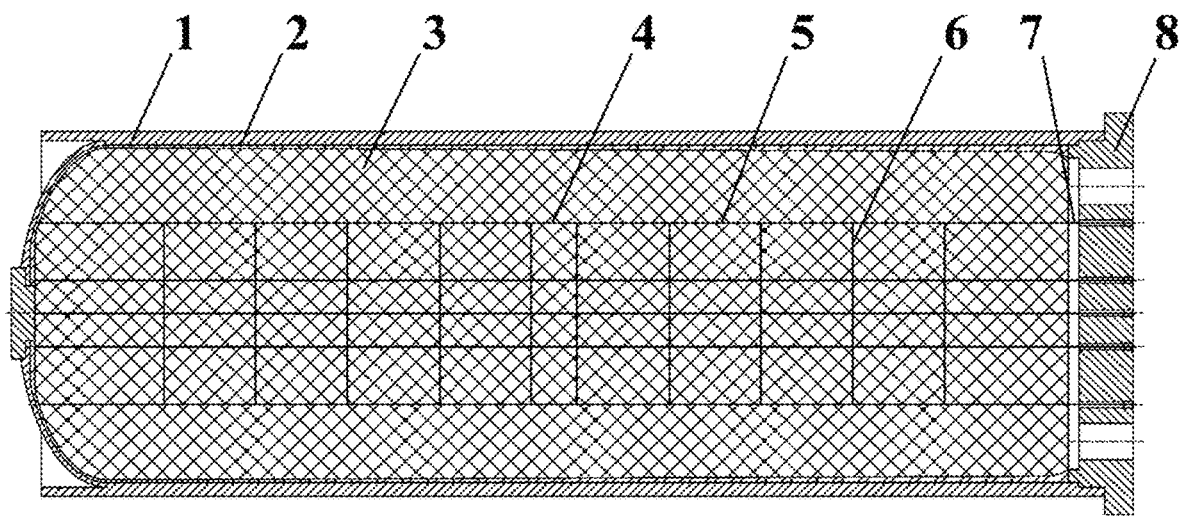
FIG. 1 is a structural sectional view of a multistage variable burning rate solid rocket motor.

In the drawings: 1 combustion chamber case; 2 insulator; 3 propellant grain; 4 fiber skeleton structure; 5 axial fiber; 6 radial fiber; 7 fixed fiber; 8 tooling; 9 metal material copper; 10 metal material nickel.

DETAILED DESCRIPTION

To make the purpose, the technical solution and the advantages of the present invention more clear, specific embodiments of the present invention will be described below in detail in combination with the drawings.

As shown in FIG. 1, a multistage variable burning rate solid rocket motor comprises a combustion chamber case 1, an insulator 2, a propellant grain 3, a fiber skeleton structure 4, a fixed fiber 7 and a tooling 8.

The insulator 2 is bonded on an inner surface of the combustion chamber case 1.

Figure 2:
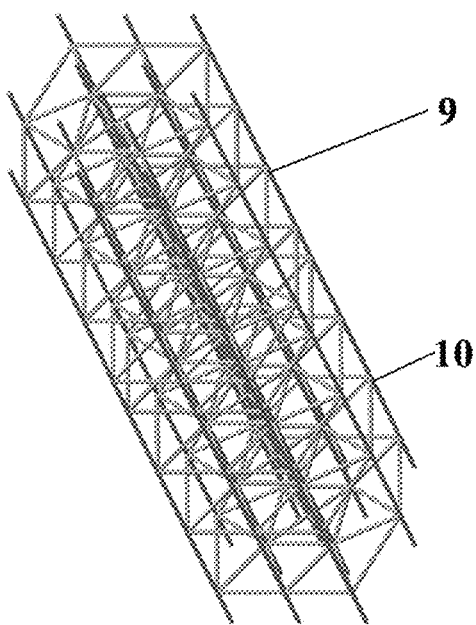
FIG. 2 is a three-dimensional schematic diagram of a fiber skeleton structure of a multistage variable burning rate solid rocket motor.

The fiber skeleton structure 4 is arranged in the combustion chamber case 1 and composed of a plurality of axial fibers 5 perpendicular to an end surface of a main grain and radial fibers 6 parallel to the end surface of the main grain, wherein front ends of the axial fibers 5 are connected with the insulator 2 by threads, and ends are connected with the fixed fiber 7; the fixed fiber 7 is connected with the tooling 8 by threads; and the radial fibers 6 are distributed along the axial fibers 5 at unequal intervals, as shown in FIG. 2.

The tooling 8 is bolted with the combustion chamber case 1 when charging, and is disassembled after charging.

After the fiber skeleton structure 4 is connected with the combustion chamber case 1, the propellant grain 3 is filled in the combustion chamber case 1 by a charge hole reserved by the tooling 8.

Figure 3:
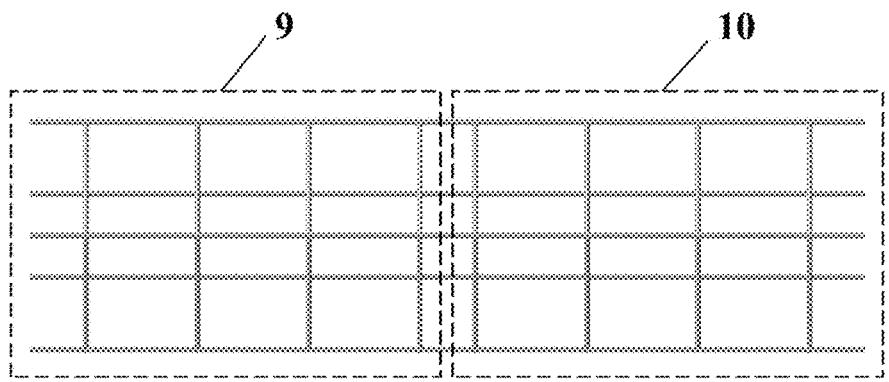
FIG. 3 is a three-dimensional side schematic diagram of a fiber skeleton structure.
Figure 4:
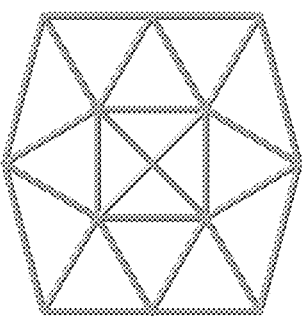
FIG. 4 is a three-dimensional end schematic diagram of a fiber skeleton structure.
Figure 5:
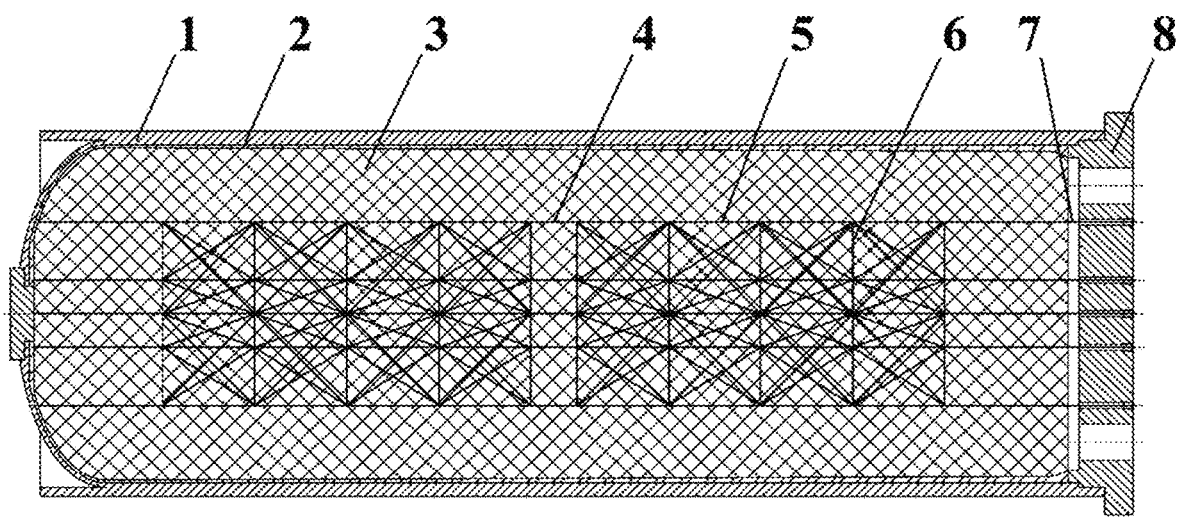
FIG. 5 is a structural sectional view of a multistage variable burning rate solid rocket motor with an additional supporting structure.
Figure 6:
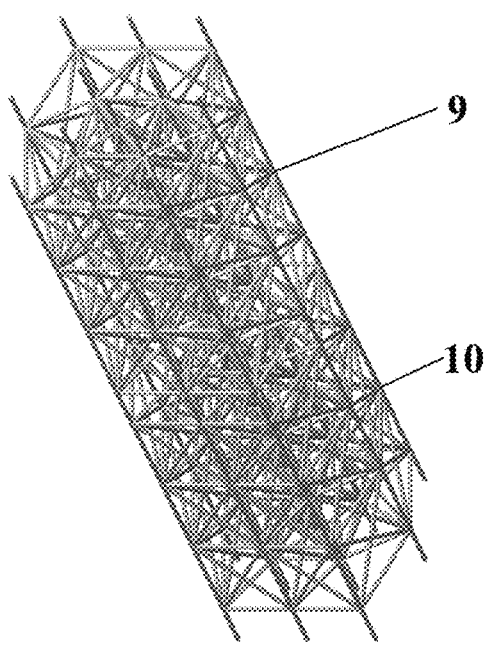
FIG. 6 is a three-dimensional schematic diagram of a fiber skeleton structure of a multistage variable burning rate solid rocket motor with an additional supporting structure.
Figure 7:
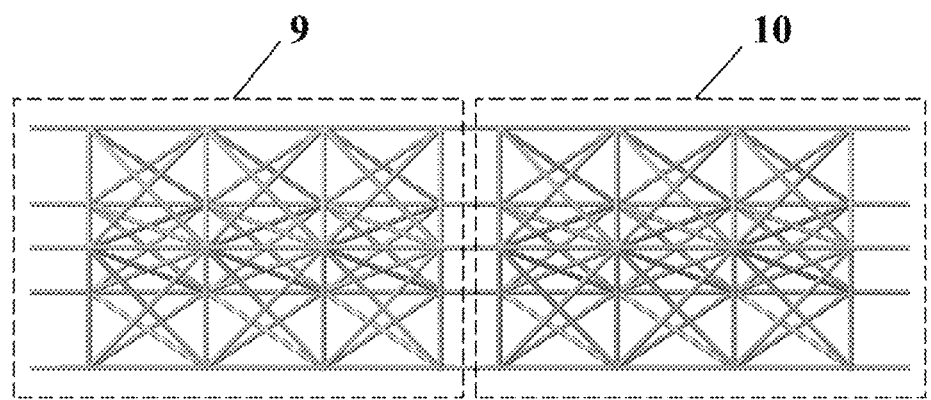
FIG. 7 is a three-dimensional side schematic diagram of a fiber skeleton structure with an additional supporting structure.
Figure 8:
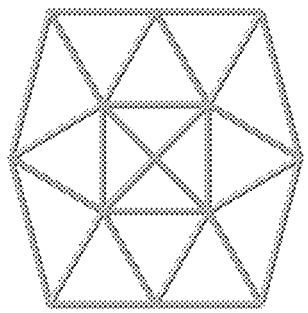
FIG. 8 is a three-dimensional end schematic diagram of a fiber skeleton structure with an additional supporting structure.

As shown in FIG. 2 to FIG. 4, the fiber skeleton structure 4 is formed by an additive manufacturing technology and composed of axial fibers 5 and radial fibers 6, wherein the fiber skeleton structure 4 is made of two metal materials of copper and nickel, and copper-nickel alloy (cupronickel) is used on a connection region between the metal material copper 9 and the metal material nickel 10 for connection transition.

A forming method of the multistage variable burning rate solid rocket motor comprises the following steps:

step 1: according to the needs of multi ballistics of a weapon system, conducting the overall design of the motor and determining a required multistage change range of the burning rate; determining the basic burning rate data and a required speed increasing ratio of the propellant grain 3 according to the change range of the burning rate, reversely calculating the thermal conductivity data of the material according to the speed increasing ratio, selecting the material of the fiber skeleton structure 4 according to the thermal conductivity range, then selecting the combined structure form of the fiber skeleton structure 4 according to the multistage change rule of the burning rate and finally printing the multistage material fiber skeleton structure 4 by additive manufacturing;

step 2: putting the fiber skeleton structure 4 from additive manufacturing into the combustion chamber case 1; after connecting the front ends of the axial fibers 5 with the insulator 2 through the threads and connecting the ends with the fixed fiber 7, making the fixed fiber 7 penetrate through the tooling 8 and tensioning; then fixing the fixed fiber 7 with the tooling 8 through the threads; and connecting the tooling 8 with the combustion chamber case 1;

step 3: after vacuuming the combustion chamber case 1, casting the propellant grain 3 through the charge hole in the tooling 8 by case bonded casting;

step 4: after the propellant grain 3 is completely solidified, removing the threads which connect the fixed fiber 7 in the tooling 8, then removing the tooling 8 and the combustion chamber case 1, and finally cutting a part connected with the fixed fiber 7 in the axial fibers 5 to complete the forming of the multistage variable burning rate solid rocket motor.

The invention claimed is:

1. A multistage variable burning rate solid rocket motor, comprising a combustion chamber case, an insulator, a propellant grain, a fiber skeleton structure and a fixed fiber, wherein
the insulator is bonded on an inner surface of the combustion chamber case;
the fiber skeleton structure is arranged in the combustion chamber case and composed of a plurality of axial fibers perpendicular to an end surface of a main grain and radial fibers parallel to the end surface of the main grain, wherein front ends of the axial fibers are connected with the insulator, and ends of the axial fibers are connected with the fixed fiber; and the radial fibers are distributed along the plurality of axial fibers;
the propellant grain is filled in the combustion chamber case.

2. The multistage variable burning rate solid rocket motor according to claim 1, wherein the fiber skeleton structure is divided into a plurality of sections with the same structure and different lengths along an axial direction according to the needs of multistage burning rate change; and each section is integrally printed and formed by additive manufacturing mode to form an overall fiber skeleton structure.

3. The multistage variable burning rate solid rocket motor according to claim 2, wherein the fiber skeleton structure is formed by connecting and combining multiple metal materials with thermal conductivity greater than 100 W/(m·K), and simultaneously satisfies the needs of additive manufacturing and skeleton strength.

4. The multistage variable burning rate solid rocket motor according to claim 3, wherein the metal materials comprise copper, silver and aluminum.

5. The multistage variable burning rate solid rocket motor according to claim 2, wherein the fiber skeleton structure is formed by connecting and combining metal materials and non-metal materials with thermal conductivity greater than 100 W/(m·K), and simultaneously satisfies the needs of additive manufacturing and skeleton strength.

6. The multistage variable burning rate solid rocket motor according to claim 5, wherein when the fiber skeleton structure is combined by multiple metal materials and non-metal materials, carbon fiber materials are used on transition regions of different materials for transition to ensure good connection and uniform transition between two materials; and the non-metal materials comprise graphite and silicon carbide.

7. The multistage variable burning rate solid rocket motor according to claim 1, wherein the radial fibers of adjacent layers in the fiber skeleton structure are supported and fixed by a plurality of crossed fibers.

8. A forming method of the multistage variable burning rate solid rocket motor according to claim 1, comprising the following steps:
step 1: according to the needs of multi ballistics of a weapon system, conducting overall design of the multistage variable burning rate solid rocket motor and determining a multistage change range of a burning rate; determining basic burning rate data and a required speed increasing ratio of the propellant grain according to change range of a burning rate, reversely calculating thermal conductivity data of the material according to the speed increasing ratio, selecting the material of the fiber skeleton structure according to the thermal conductivity range, then selecting a combined structure form of the fiber skeleton structure according to the multistage change rule of the burning rate and finally printing a multistage material fiber skeleton structure by additive manufacturing;
step 2: putting the fiber skeleton structure from additive manufacturing into the combustion chamber case; after connecting the front ends of the axial fibers with the insulator through threads of the insulator and connecting the ends with the fixed fiber, making the fixed fiber penetrate through a tooling and then tensioning the fixed fiber; then fixing the fixed fiber with the tooling through the threads of the tooling; and connecting the tooling with the combustion chamber case;
step 3: after vacuuming the combustion chamber case, casting the propellant grain through a charge hole on the tooling by case bonded casting;
step 4: after the propellant grain is completely solidified, removing the threads which connect the fixed fiber in the tooling, then removing the tooling from the combustion chamber case, and finally cutting a part connected with the fixed fiber in the axial fibers to complete the forming of the multistage variable burning rate solid rocket motor.

\* \* \* \* \*